(12) United States Patent
Backman et al.

(10) Patent No.: US 8,390,236 B2
(45) Date of Patent: Mar. 5, 2013

(54) DRIVE SYSTEM FOR OPERATING AN ELECTRIC DEVICE

(75) Inventors: Magnus Backman, Västerås (SE); Stefan Valdemarsson, Lidköping (SE)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/157,566

(22) Filed: Jun. 10, 2011

(65) Prior Publication Data
US 2012/0146749 A1 Jun. 14, 2012

Related U.S. Application Data

(63) Continuation of application No. PCT/EP2009/066955, filed on Dec. 11, 2009.

(30) Foreign Application Priority Data

Dec. 12, 2008 (EP) .................................. 08171412

(51) Int. Cl.
*H02P 8/00* (2006.01)
(52) U.S. Cl. ................... 318/696; 318/685; 318/437
(58) Field of Classification Search .............. 318/696, 318/685, 437; 307/112, 137, 138, 139
See application file for complete search history.

(56) References Cited

U.S. PATENT DOCUMENTS

| | | | |
|---|---|---|---|
| 4,227,164 A | | 10/1980 | Kitahara |
| 4,445,077 A | * | 4/1984 | Kirschner .................... 318/696 |
| 4,689,734 A | | 8/1987 | Lang |
| 4,795,929 A | * | 1/1989 | Elgass et al. .................... 310/36 |
| 6,046,423 A | | 4/2000 | Kishida et al. |
| 6,215,263 B1 | | 4/2001 | Berkowitz et al. |
| 6,586,899 B2 | * | 7/2003 | Joch ............................. 318/434 |
| 6,774,594 B2 | * | 8/2004 | Fitzgibbon et al. ............ 318/466 |
| 7,622,829 B2 | * | 11/2009 | Valdemarsson et al. ....... 307/139 |
| 7,948,193 B2 | * | 5/2011 | Komatsu et al. .......... 318/400.01 |
| 2003/0214269 A1 | | 11/2003 | Shiue et al. |

(Continued)

FOREIGN PATENT DOCUMENTS
EP 0 800 195 A2 10/1997
EP 1 906 423 A1 4/2008

(Continued)

OTHER PUBLICATIONS

International Search Report (PCT/ISA/210) issued on Feb. 2, 2010, by European Patent Office as the International Searching Authority for International Application No. PCT/EP2009/066955.

(Continued)

*Primary Examiner* — Walter Benson
*Assistant Examiner* — Thai Dinh
(74) *Attorney, Agent, or Firm* — Buchanan Ingersoll & Rooney PC

(57) ABSTRACT

A drive system is disclosed for operating an electric device. The drive system includes an electric motor having a permanent magnet rotor connectable to the electric device for controlling the operation of it by a limited-angle rotation, the electric motor further including a stator winding. The drive system includes a drive circuit connected to the stator winding. The permanent magnet rotor can be arranged to be aligned to a magnetic field created by the stator winding when supplied with current from the drive circuit, so that a maximum torque can be applied to the rotor and thereby to the movable part within an interval of ±25 degrees around a middle position between two end positions of the limited-angle rotation of the rotor.

16 Claims, 5 Drawing Sheets

U.S. PATENT DOCUMENTS

2003/0214270 A1 11/2003 Shiue et al.
2007/0096682 A1 5/2007 Valdemarsson et al.

FOREIGN PATENT DOCUMENTS

| GB | 2 226 453 A | 6/1990 |
| SU | 1739066 A1 | 6/1992 |
| WO | WO 02/50477 A1 | 6/2002 |
| WO | WO 2005/024877 A1 | 3/2005 |

OTHER PUBLICATIONS

Written Opinion (PCT/ISA/237) issued on Feb. 2, 2010, by European Patent Office as the International Searching Authority for International Application No. PCT/EP2009/066955.

International Preliminary Report on Patentability issued Dec. 28, 2010, by European Patent Office as the International Searching Authority for International Application No. PCT/EP2009/066955.

* cited by examiner

Start position

End position

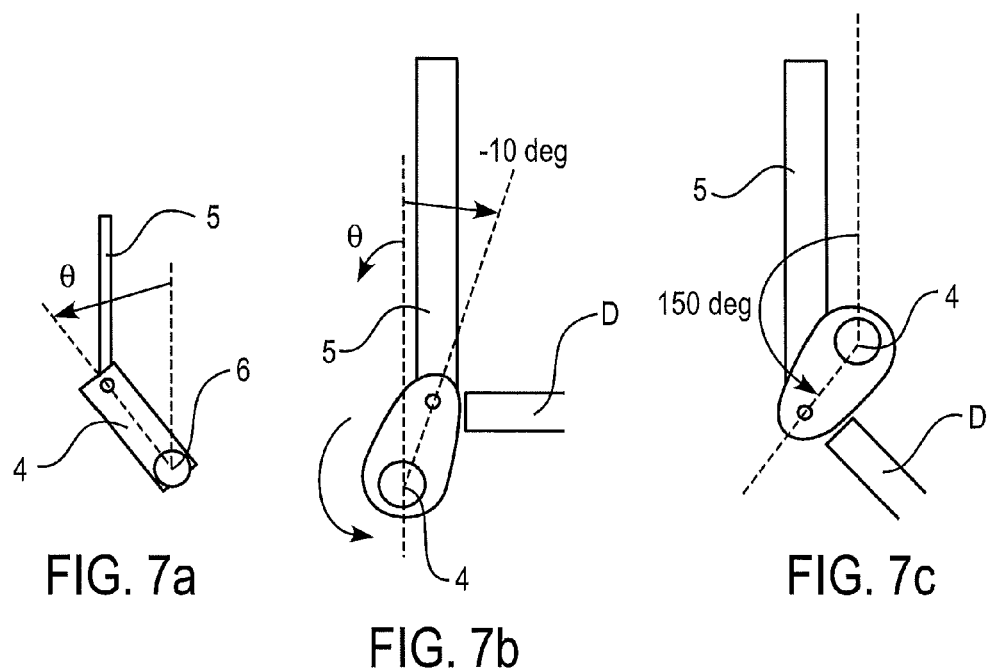
FIG. 7a
FIG. 7b
FIG. 7c
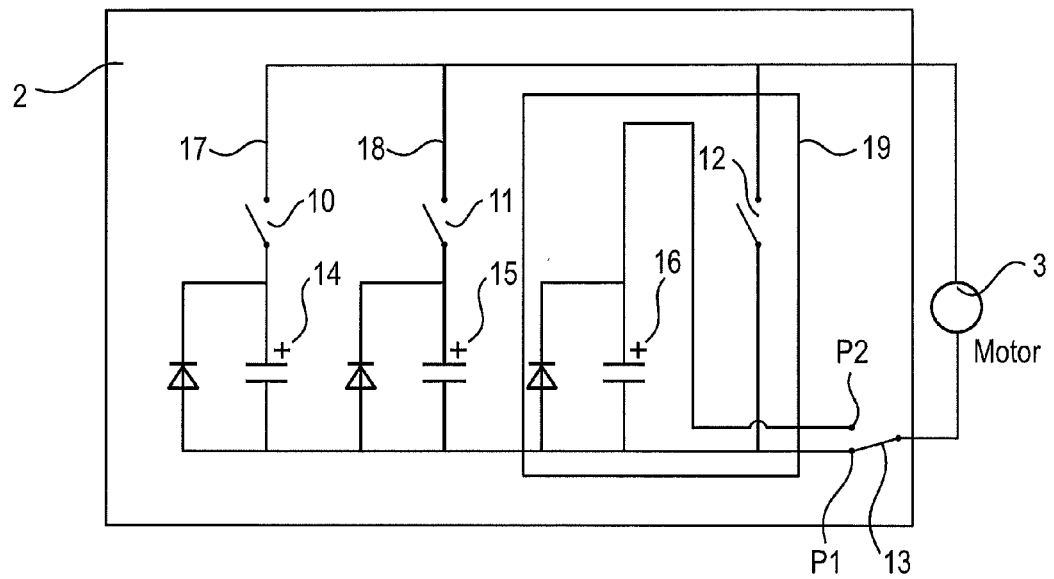
FIG. 8

DRIVE SYSTEM FOR OPERATING AN ELECTRIC DEVICE

RELATED APPLICATION

This application claims priority as a continuation application under 35 U.S.C. §120 to PCT/EP2009/066955, which was filed as an International Application on Dec. 11, 2009 designating the U.S., and which claims priority to European Application 08171412.3 filed in Europe on Dec. 12, 2008. The entire contents of these applications are hereby incorporated by reference in their entireties.

FIELD

The present disclosure is related to the field of drive systems for operating electrical devices, such as a high voltage circuit breaker, by acting on a movable part of the electric device.

BACKGROUND OF THE INVENTION

Circuit breakers are utilized throughout electrical power distribution networks for protecting the networks from damage caused by, for example, overload or short circuits. The circuit breaker is operated by a drive system effectuating the opening and closing of the circuit breaker. The circuit breaker has to be opened (tripped) quickly upon detection of a fault, and this in turn puts high demands on the drive system for operating the circuit breaker. The opening and closing of contacts of the circuit breaker should be performed rapidly and reliably.

An example of such drive system includes a mechanical spring. The energy stored in the spring is released and utilized for opening the circuit breaker contact members.

International Patent Publication WO 2005/024877 discloses another example of such drive system for operating a circuit breaker. The drive system includes, for example, an electric motor energized by a drive circuit having electronics such as capacitor banks and thyristors.

Although this can be an acceptable solution, the thyristors and related electronic components make it a rather costly one. It would therefore be desirable to provide alternatives for operating circuit breakers, which can be less expensive.

Another drive system using an electric motor is described in GB2226453. In this document there is provided an electromagnetic switch drive having a switch drive shaft which is connected to a switching member which is rotatable between two switch positions. A bar-shaped two-pole permanent magnet is rotationally rigidly mounted on the switch drive shaft. The magnet is magnetised at right angles to the switch drive shaft and capable of being turned by the magnetic field of a pole-reversible DC voltage-operated coil between two extreme positions defined by abutments. In the document these abutments are described as being placed for limiting the angle of rotation of the permanent magnet to a maximum of 60 on either side of the transverse axis of the coil which defines a midway position.

U.S. Pat. No. 4,227,164 describes a rotary solenoid or similar electromagnetic rotating apparatus that is capable of smoothly rotating through an angular range of approximately 180 degrees, in both directions, without employing a return spring or other similar device.

U.S. Pat. No. 4,795,929 describes a rotary actuator in which there is a freely rotatable permanent magnetic armature between two stators. At least one of the stators produces an asymmetrical magnetic flux field that acts upon the magnetic field of the armature to cause the same to rotate.

EP0800195 describes a drive system for driving a circuit breaker using a relay.

SUMMARY

A drive system is disclosed for operating an electric device by acting on a movable part of the electric device, said drive system comprising: an electric motor having a stator winding and having a permanent magnet rotor connectable to said movable part of said electric device for controlling the operation of said electric device by a limited-angle rotation; and an electric drive circuit connected to said stator winding, wherein said permanent magnet rotor is arranged to be aligned to a magnetic field created by said stator winding when the stator winding is supplied with current from said electric drive circuit, so that a maximum torque will be applied to said rotor and thereby to said movable part within an interval of ±25 degrees around a middle position between two end positions of said limited-angle rotation of said rotor, said electric drive circuit including at least three branches connected in parallel, each branch having a mechanical relay and a capacitor bank connected in series, said electric drive circuit further including a fourth mechanical relay for enabling a current direction reversal.

A drive system is also disclosed for operating an electric device by acting on a movable part of the electric device, said drive system comprising: an electric motor having a stator winding and having a permanent magnet rotor connectable to said movable part of said electric device for controlling the operation of said electric device by a limited-angle rotation; and an electric drive circuit connected to said stator winding, wherein said permanent magnet rotor is arranged to be aligned to a magnetic field created by said stator winding when the stator winding is supplied with current from said electric drive circuit, so that a maximum torque will be applied to said rotor and thereby to said movable part around a middle position between two end positions of said limited-angle rotation of said rotor, said electric drive circuit including at least three branches connected in parallel, each branch having a mechanical relay and a capacitor bank connected in series.

BRIEF DESCRIPTION OF THE DRAWING FIGURES

Further features and advantages thereof are defined in the dependent claims and will become clear when reading the following description, in conjunction with the drawings, wherein:

FIG. 7a illustrates a mechanical angle translated into an angle of a movement transmission mechanism;

FIGS. 7b and 7c illustrate a movement transmission mechanism in accordance with an exemplary embodiment in a closed and open position, respectively;

FIG. 8 illustrates an electric drive circuit for driving the electric motor in accordance with an exemplary embodiment.

DETAILED DESCRIPTION

A drive system is disclosed for operating an electrical device, such as a circuit breaker, having a cost-efficient design, and overcoming shortcomings of known solutions.

An exemplary drive system is disclosed for operating an electrical device, such as a circuit breaker, which can enable a reliable and rapid operation of the electrical device.

In accordance with an exemplary embodiment, a drive system for operating an electric device, such as a circuit breaker, by acting on a movable part of the electric device is provided. The drive system can comprise an electric motor having a permanent magnet rotor connectable to the movable part of the electric device for controlling the operation of it by a limited-angle rotation. The electric motor can further comprise a stator winding. The drive system can further comprise a drive circuit connected to the stator winding. In the drive system the permanent magnet rotor can also be arranged to be aligned to a magnetic field, created by the stator winding when supplied with current from the drive circuit, so that a maximum torque can be applied to the rotor and thereby to the movable part within an interval of ±25 degrees around a middle position between two end positions of said limited-angle rotation of said rotor. The electric drive circuit can comprise at least three branches connected in parallel, each branch comprising a mechanical relay and a capacitor bank connected in series. The electric drive circuit can further comprise a fourth mechanical relay for enabling a current direction reversal. In exemplary embodiments, the electric motor only needs one current pulse for each operation. Thereby costs related to electronics for supplying positive or negative current depending on rotor position can be eliminated. Further, a very cost-efficient solution can be achieved that also can provide very reliable operation of a circuit breaker. Further, a zero torque crossing can be avoided in exemplary embodiments.

In an exemplary embodiment, maximum torque can be applied to the rotor and thereby to the movable part at about a middle point, (about halfways) in the limited-angle rotation of the rotor.

In accordance with another exemplary embodiment, the direction of the rotor can be fixed in relation to a mechanical angle used for performing an operation. A novel design of an electric motor can be used, such that a single current pulse can be used for operation, which can thereby enable the use of mechanical relays instead of thyristors and related electronics. As there is no need for current switching to obtain desired travel performing the operation, the drive circuit can be made less complicated and thus easy to manufacture. This again can render the drive system more cost-efficient compared to known solutions.

Figure 1:
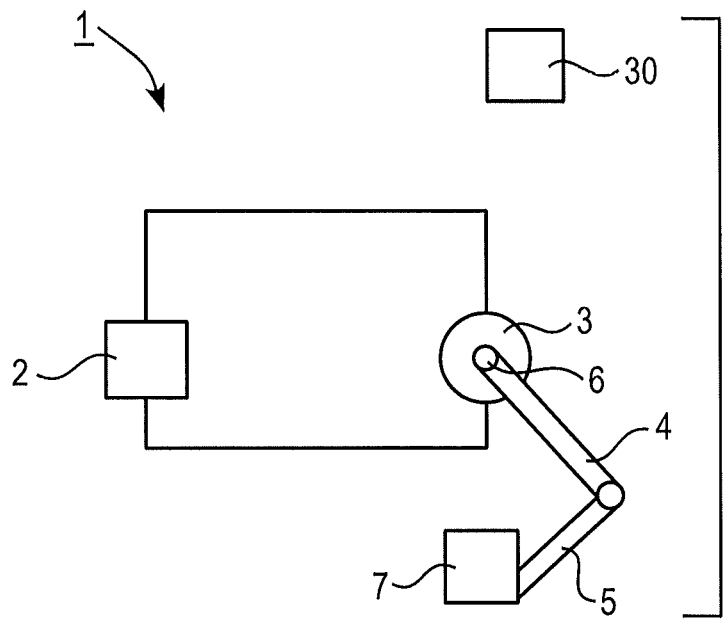
FIG. 1 illustrates schematically an exemplary embodiment for operating a circuit breaker.

Referring to FIG. 1, a drive system 1 in accordance with an exemplary embodiment is illustrated schematically for operating an electric device, such as a high voltage circuit breaker. In the following a circuit breaker is used as an example to illustrate an electrical device operated by means of the drive system 1. The drive system 1 may thus be used for operating on a movable part, such as contact members, of the circuit breaker so as to open or close it. However, the drive system 1 may be used for operating other electric devices as well, such as for example opening and closing of fast-acting valves or any other desired devices.

An exemplary drive system 1 comprises an electric drive circuit 2 for controlling the operation of an electric actuator 3. The electric actuator 3 used in an exemplary embodiment comprises an electric single-phase motor and is in the following denoted as an electric motor 3. The electric motor 3 comprises a rotor 6 that is connectable to an output shaft 4. The output shaft 4 is connected via a mechanical linkage 5 to a movable part of an electric device such as a high voltage circuit breaker, schematically illustrated at reference numeral 7.

Figure 2A:
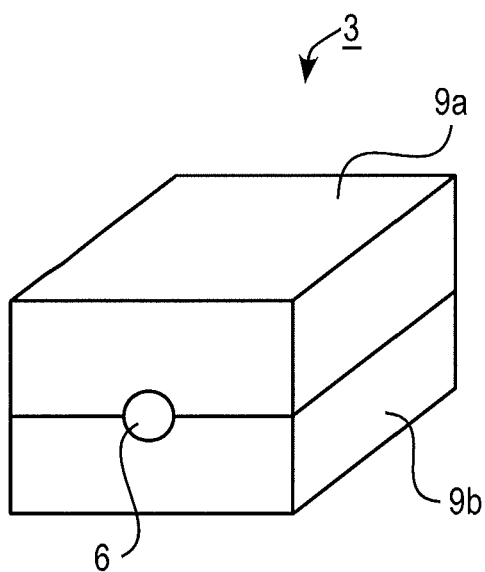
FIGS. 2a and 2b illustrate an exemplary electric single-phase motor which can be used in accordance with exemplary embodiments.
Figure 2B:
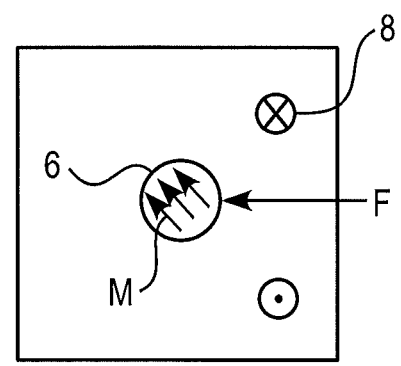

FIGS. 2a and 2b illustrate an exemplary electric motor 3 in some more detail. The electric motor 3 comprises the rotor 6, which is a permanent magnet rotor, for example comprising a hollow cylinder, denoted rotor tube, in turn comprising a permanent magnet. The rotor 6 is connectable to the output shaft 4, to thereby control the opening and closing of the circuit breaker. The electric motor 3 further comprises a stator formed by two stator halves 9a, 9b and having a single winding 8 on the stator 9a, 9b. The coil winding 8 is connected to the electric drive circuit 2. By applying a current to the coil winding 8 a magnetic field is created that the permanent magnet of the rotor 6 wants to align to. The letter F in FIG. 2b indicates schematically the flux from the coil winding 8, and the letter M indicates the magnetic field lines of the rotor 6. The magnetic field F created by the current in the coil winding 8 together with the magnetic field M of the rotor 6, results in a torque being applied on the rotor 6. As the rotor 6 is connected to the movable part of the circuit breaker 7 via the output shaft 4 and the linkage 5, the torque is thus applied also on the movable part, thereby effectuating the desired operation.

Figure 3:
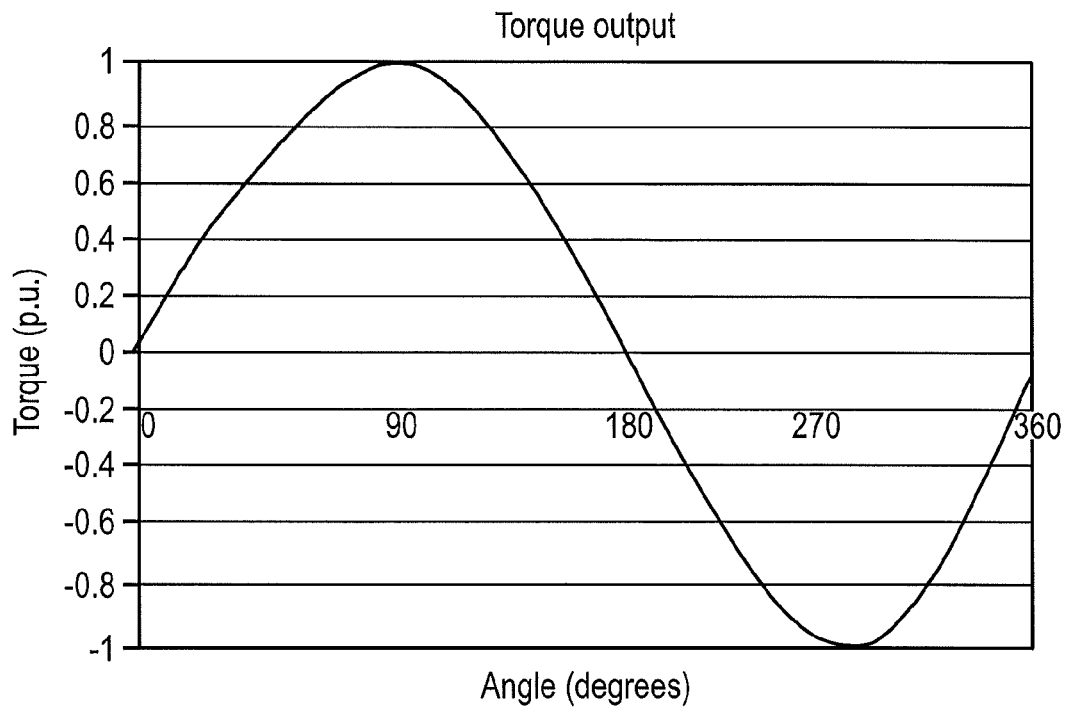
FIG. 3 illustrates an exemplary torque output as a function of angle between permanent magnetic field and magnetic field direction.

FIG. 3 illustrates the torque output as a function of angle between permanent magnet field lines and the magnetic field direction created by the coil winding when supplied with a current of, for example, a known motor as discussed herein. When the permanent magnet field is aligned in the same direction as the magnetic field of the coil winding, the torque becomes zero. When the permanent magnet direction is perpendicular to the field of the coil winding, the torque has its maximum. There is thus a maximum in torque when the field lines are perpendicular to each other and a minimum when they are aligned. Between the maximum and the minimum, there is principally a sinusoidal torque output for a given magnetic flux.

Figure 4:
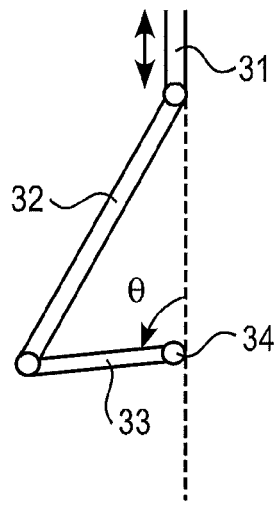
FIG. 4 illustrates a known movement transmission mechanism between a switch and a motor actuating the switch.

In order to provide a full understanding of an exemplary embodiment, aspects of known solutions are described in some more detail in the following. FIG. 4 illustrates schematically a known movement transmission mechanism between a device such as a circuit breaker (not illustrated) and a motor actuating the circuit breaker, as disclosed in the earlier mentioned International Patent Publication WO 2005/024877, assigned to the same applicant as the present application. The above described torque output applies to the motor disclosed therein. For example, an operating rod 31 is connected to a movable part of the circuit breaker and arranged to move up and down in the vertical direction. A linkage 32, 33 connects the operating rod 31 to the output rotor shaft 34 of the rotor. The circuit breaker is closed when the linkage part 33 connected to the output rotor shaft 34 is aligned with the operating rod 31 and the other linkage part 32 (e.g., when the angle of deflection θ=0°). When the circuit breaker is to be opened the output rotor shaft 34 is rotated from θ=0° to θ=180°. The rotation is enabled by driving a current through the stator winding of the rotor for a short period of time.

The working area of the magnetic angle is, in this FIG. 4 arrangement, approximately from 65 to 280 degrees (i.e., the zero torque point is passed at 180 degrees and after 180 degrees the motor starts to decelerate if the magnetic field has the same direction). If the current is instead reversed, the magnetic field changes sign and a continued positive torque is given. In known manner, the zero torque point is passed owing to kinetic energy of the rotor.

Figure 5:
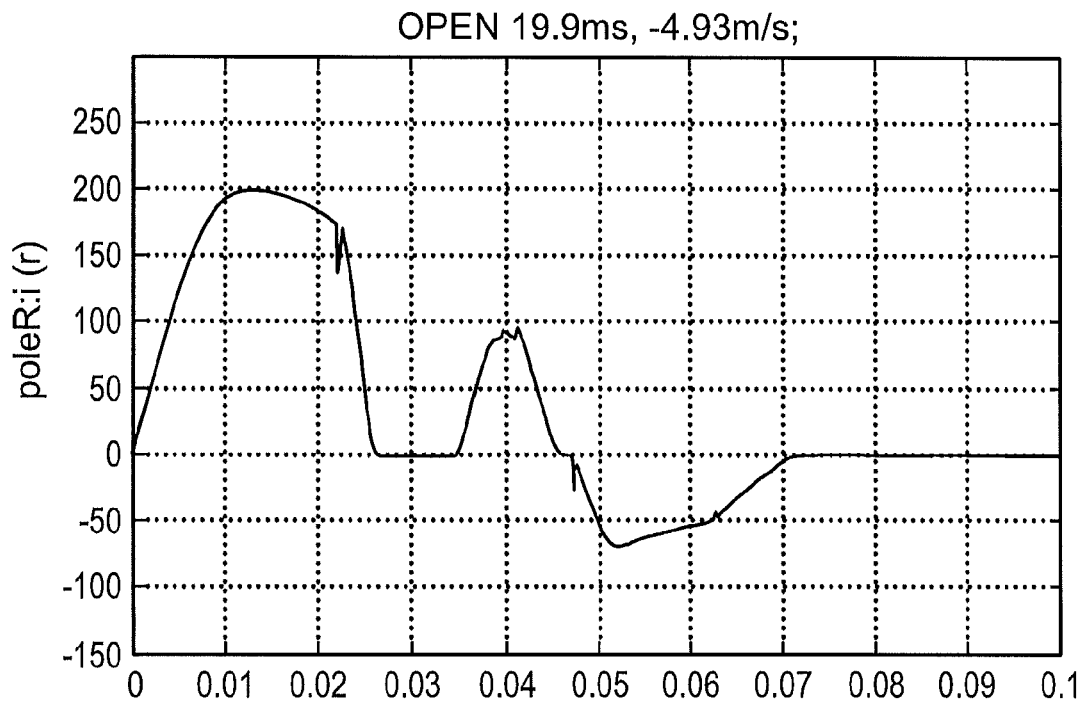
FIG. 5 illustrates a current profile for the motor used in the FIG. 4 solution.

FIG. 5 illustrates an exemplary current profile for the above-described motor. FIG. 5 illustrates the current to the motor for an opening operation, beginning with an acceleration phase, after which a positive current pulse provides retardation, followed by a negative current pulse providing the final pushing mode in order to fully open the contact members of the circuit breaker.

However, as mentioned in the background section of this application, the drive circuit of this known system comprises expensive electronic components. The design is also a rather complicated sequence of positive or negative currents supplied to the motor depending on the rotor position, and involves much electronics.

Figure 6A:
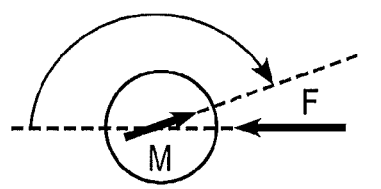
FIGS. 6a and 6b illustrate a magnetic angle for a start position and an end position in accordance with an exemplary embodiment, respectively.
Figure 6B:
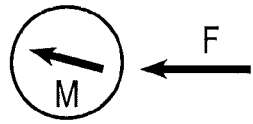

In accordance with novel exemplary embodiments described herein, the working area of a magnetic angle is changed. The magnetic angle is understood to be the angle between the magnetic field lines of the permanent magnet of the rotor 6 and the magnetic field lines created by the stator winding 8. In accordance with an exemplary embodiment, this magnetic angle is, at the starting position, within the range of, for example, 150°-170°, for example 160° or 155°, which can be compared to the known solution of approximately 270°. A magnetic angle for the start position and end position is illustrated in FIGS. 6a and 6b, respectively. As in FIG. 2b, the letter M indicates magnetic field lines of the rotor 6 and the letter F indicates the flux from the coil winding 8.

The inventors have found that the current pulses can be changed to a single current pulse for each open/close operation by modifying the working area of the magnetic angle in the electric motor 3. The working area 10° to 170°, instead of the known 65° to 280°, was found to provide a solution wherein the torque and energy output was not lowered too much. In fact, the decrease of torque and energy output was restricted to about 10%, which still provides a fully functioning and reliable solution. It is noted that the working area mentioned (i.e., 10° to 170°, is approximate (e.g., to within ±10%), but should however fulfil the specified 0°<working area<180°).

Further, in accordance with exemplary embodiments, the permanent magnet direction is fixed in relation to a mechanical angle needed for an operation. The mechanical angle indicates the rotation angle made by the rotor 6, needed for the desired movement of the output shaft 4, connected to the mechanical linkage 5, for moving the contact members of the circuit breaker. The mechanical angle can be translated into an angle between a starting position (θ=0) of the mechanical linkage 5 and the current position of the output shaft 4, as is indicated at θ in FIG. 7a.

FIGS. 7b and 7c illustrate an exemplary corresponding change of mechanical angle shift in accordance with exemplary embodiments disclosed herein. For example, the figures illustrate a movement transmission mechanism, the mechanical linkage 5, in accordance with exemplary embodiments in the closed and open positions, respectively. Assuming that the magnetic angle working area is 170°-10°, the mechanical start angle could then be chosen to be −10° in closed position, illustrated in FIG. 7b, achieving a self-locking in closed position. The open position, illustrated in FIG. 7c, or the mechanical end position is, for example, accordingly about 150°, since the mechanical angle and the magnetic angle makes an equally large travel, in the above example 160°. It is noted that the mechanical start angle can be chosen to be any desired angle.

In accordance with exemplary embodiments, maximum torque can be applied to the rotor 6 and thereby to the movable part of the circuit breaker 7 at about half-ways in the limited-angle rotation of the rotor 6. This is in contrast to the known solution, wherein maximum torque is applied at the starting position, (i.e., the magnetic field lines of the permanent magnet rotor is perpendicular to the magnetic field created by the current flow in the stator winding). The maximum torque could be applied to the rotor within an interval of approximately ±30 degrees, or ±25 degrees and more preferably within an interval of, for example, approximately ±22.5 degrees about the middle position of the limited-angle rotation, although about half-ways provides reliable results for most applications. The middle position is understood to be half-ways between the two end positions of the limited-angle rotation.

Owing to the uncomplicated design of the drive system 1 in accordance with exemplary embodiments disclosed herein, it can be difficult to accomplish an electrical braking at the end of a stroke. Therefore, mechanical dampers D or other end stops are, for example, preferably provided at the end of the stroke, for example dampers similar to the ones that are used for known spring operated mechanisms.

The modification of the working area of the magnetic angle enables the operation of the circuit breaker with one single current pulse, a positive current for opening the circuit breaker and a negative current for closing it. This modification in turn makes it possible to supply current to the motor 3 with the use of mechanical relays in the drive circuit 2. Mechanical relays are more cost-efficient and reliable thereby rendering the drive circuit 2 less expensive than the known solution that utilizes thyristors. Four mechanical relays are used to supply current to the motor 3 from three separate capacitor banks as will be described next with reference to FIG. 8.

FIG. 8 illustrates an electric drive circuit 2 for driving the electric motor in accordance with an exemplary embodiment. The drive circuit 2 comprises three branches 17, 18, 19 connected in parallel. Each branch 17, 18, 19 comprises a mechanical relay 10, 11, 12 connected in series with a capacitor bank 14, 15, 16.

A fourth mechanical relay 13 is provided for enabling a current direction change.

The mechanical relays 10, 11 and 12 may be any simple on-off switch (e.g., SPST (Single Pole, Single Throw) relay). The mechanical relay 13 is a simple two-way relay (change-over relay), (e.g., SPDT (Single Pole, Double Throw) relay).

The mechanical relays 10, 11 and 12 are, together with a respective capacitor bank 14, 15, 16, arranged to provide current for two open operations and one close operation. The mechanical relay 10 is connected in series with a first capacitor bank 14. When there is a fault detected and the circuit breaker is to be opened (tripped), the mechanical relay 10 is switched to closed position and mechanical relay 13 is switched to position P1. By switching the mechanical relay 13 a current flows through the coil winding 8 creating the magnetic field F and thereby rotating the rotor 6 of the motor 3 the mechanical angle desired.

Next, when the circuit breaker is to be closed, mechanical relay 12, connected in series with the second capacitor bank 16, is closed and the mechanical relay 13 is switched to position P2, thereby enabling a current to flow in the reverse direction through the coil winding 8 and a corresponding rotation of the rotor 6 in the reverse direction.

If the fault that caused the circuit breaker to be opened is still present, a second open operation can be performed: mechanical relay 11, connected in series with the third capacitor bank 15, is closed and the mechanical relay 13 is switched to position P1 and an operation as described above for mechanical relay 10 takes place.

The mechanical relays 11, 12, 13, 14 thus supply current to the motor 3 from three separate capacitor banks 14, 15, 16, the capacitor banks being dimensioned so as to provide energy for an open-close-open operation. As an example, for a high voltage circuit breaker application, a capacitor suitable for the open operations are 1.2 mF with a voltage rating of 400 V (capacitor banks 14, 15), and a capacitor suitable for the close operation is 0.7 mF with a voltage rating of 400 V (capacitor bank 16).

It is noted that the drive system 1 can further comprise a control device, illustrated schematically and indicated at reference numeral 30 in FIG. 1, arranged to control the drive system 1. For example, the control device 30 is adapted (e.g., configured) to control the electric motor 3 to carry out its angular motion, for example within the interval of approximately 10°-170° for operating the electric device 7, arranged to switch the mechanical switches etc.

It is further noted that although three branches 17, 18, 19 are described, yet additional branches may be used in some applications. For example, there are specifications that require the circuit breaker to be able to perform open-close-open-close-open operations, in which case two additional branches (not illustrated) can be used. The use of yet further branches is contemplated and is within the scope of the present disclosure.

In summary, the use of mechanical relays 10, 11, 12, 13 are enabled by the described modification of the design (e.g., configuration) of the electric motor and how the permanent magnet direction is fixed in relation to the mechanical angle needed for the operation. While known single phase limited angle motors have an alignment of the permanent magnet giving zero torque somewhere in the middle of the total rotating angle, exemplary embodiments disclosed herein can have peak torque in the middle of the total rotating angle. Correspondingly, where maximum torque is applied to the rotor at the starting position of known configurations, exemplary embodiments disclosed herein can include torque at the starting position which is not maximum. As such, an electric motor as disclosed herein can operate with one current pulse for each operation, where known motors involve two current pulses with different polarity to get desired motion. As the change disclosed herein enables the use of mechanical relays instead of more expensive electronic components a more cost-efficient solution can be provided as well.

It is noted that the described solutions, having the maximum torque output altered compared to known solutions, could be implemented using thyristor switches. Although the use of thyristors today can be a more expensive solution than the use of mechanical relays, and can therefore be avoided, it is contemplated that at some future date, also the use of thyristors could provide a cost-efficient solution, for example when a larger sales volume renders the thyristor switches less expensive. Therefore, in an alternative embodiment, the mechanical relays are exchanged for thyristor switches. The advantages described in the preceding paragraph are then provided also by a thyristor-based solution.

Figure 9:
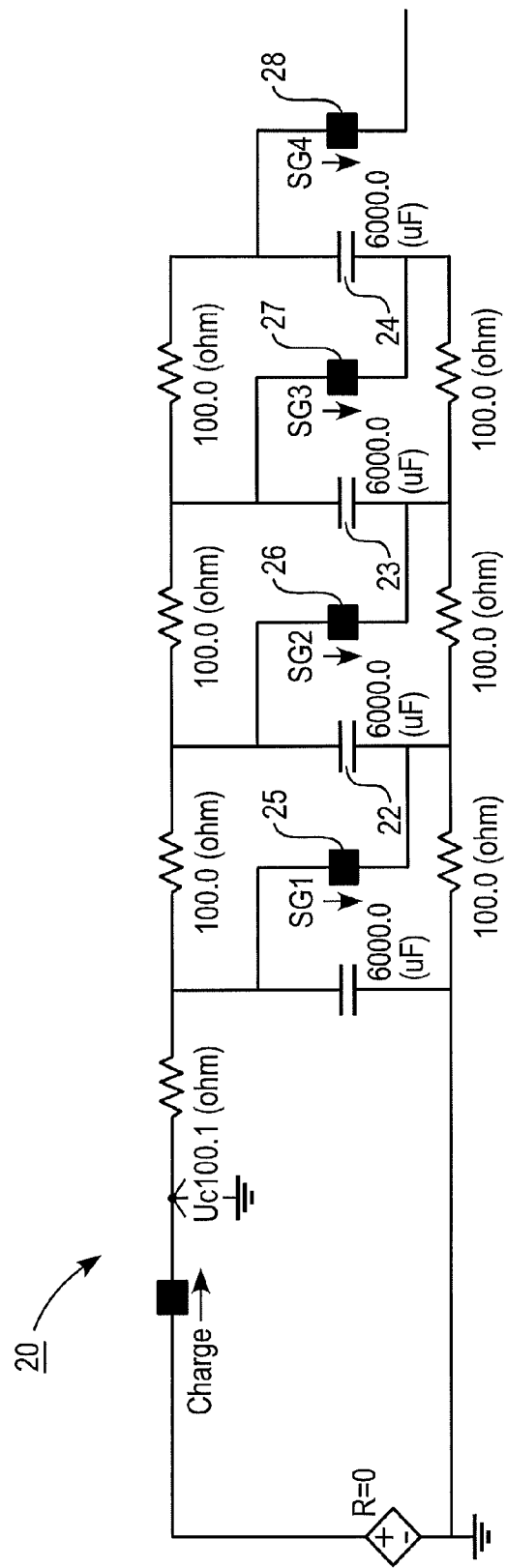
FIG. 9 illustrates an exemplary charger unit for charging the drive system in accordance with an exemplary embodiment.

In an exemplary embodiment disclosed herein, an improved capacitor charger 20 can be provided for charging the above-described drive system 1. With reference to FIG. 9, the total capacitor bank can be dimensioned to provide energy for the open-close-open operations of the circuit breaker, also denoted break-make-break operations. In accordance with this embodiment, the capacitor bank 20 is divided into smaller low voltage units 21, 22, 23, 24. The low voltage capacitor units 21, 22, 23, 24 are charged in parallel. During operation, when the energy should be discharged from the capacitor banks, the low voltage capacitor units 21, 22, 23, 24 are connected in series to get the needed output voltage. The change from parallel to series connection of the capacitor units 21, 22, 23, 24 is made by mechanical relays 25, 26, 27, 28, for example of same type as the mechanical relays 11, 12, 13. By this set-up it is possible to use the auxiliary voltage, such as 110 V DC, directly to charge the low voltage capacitor units without the need of voltage step-up devices.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A drive system for operating an electric device by acting on a movable part of the electric device, said drive system comprising:
   an electric motor having a stator winding and having a permanent magnet rotor connectable to said movable part of said electric device for controlling the operation of said electric device by a limited-angle rotation; and
   an electric drive circuit connected to said stator winding, wherein said permanent magnet rotor is arranged to be aligned to a magnetic field created by said stator winding when the stator winding is supplied with current from said electric drive circuit, so that a maximum torque will be applied to said rotor and thereby to said movable part within an interval of ±25 degrees around a middle position between two end positions of said limited-angle rotation of said rotor, said electric drive circuit including at least three branches connected in parallel, each branch having a mechanical relay and a capacitor bank connected in series, said electric drive circuit further including a fourth mechanical relay for enabling a current direction reversal.

2. The drive system as claimed in claim 1, wherein said maximum torque will be applied to said rotor for application to said movable part at about the middle position in said limited-angle rotation of said rotor.

3. The drive system as claimed in claim 2 wherein each of said branches is arranged to provide energy to said stator winding of said electric motor for operating said electric device.

4. The drive system as claimed in claim 3, wherein said limited-angle rotation is within an interval of about 10° to 170° and said movable part is arranged to move within the interval from about −10° to about 150°.

5. The drive system as claimed in claim 2, wherein said electric drive circuit is configured to impart an entire operation of said movable part in response to a single current pulse provided by said electric drive circuit.

6. The drive system as claimed in claim 5, in combination with an electric device which comprises:
a circuit breaker, and a operation cycle of the electric device includes closing of circuit breaker contact members or opening of said circuit breaker contact members.

7. The drive system as claimed in claim 6, comprising:
a control device for controlling said electric motor to carry out an angular motion within an interval of approximately 10°-170° for operating said electric device.

8. The drive system as claimed in claim 7, comprising:
a charger device having a number of capacitor units arranged to be charged in parallel, and having means for connecting said capacitor units in series for providing energy for operation of said electric device.

9. The drive system as claimed in claim 1, wherein each of said branches is arranged to provide energy to said stator winding of said electric motor for operating said electric device.

10. The drive system as claimed in claim 1, wherein said limited-angle rotation is within an interval of about 10° to 170° and said movable part is arranged to move within the interval from about −10° to about 150°.

11. The drive system as claimed in claim 1, wherein said electric drive circuit is configured to impart an entire operation of said movable part in response to a single current pulse provided by said electric drive circuit.

12. The drive system as claimed in claim 1, in combination with an electric device which comprises:
a circuit breaker, and a operation cycle of the electric device includes closing of circuit breaker contact members or opening of said circuit breaker contact members.

13. The drive system as claimed in claim 1, comprising:
a control device for controlling said electric motor to carry out an angular motion within an interval of approximately 10°-170° for operating said electric device.

14. The drive system as claimed in claim 1, wherein a direction of said permanent magnet rotor is fixed in relation to a mechanical angle used for operation.

15. The drive system as claimed in claim 1, comprising:
a charger device having a number of capacitor units arranged to be charged in parallel, and having means for connecting said capacitor units in series for providing energy for operation of said electric device.

16. The drive system as claimed in claim 15, wherein said means for connecting said capacitor units in series comprises:
mechanical relays.

* * * * *